United States Patent [19]

Miller et al.

[11] Patent Number: 5,620,503
[45] Date of Patent: Apr. 15, 1997

[54] HUMIDIFIER AND METHOD FOR HUMIDIFYING AIR

[75] Inventors: Thomas L. Miller, Linden; Joseph M. Maceri, Swartz Creek, both of Mich.

[73] Assignee: Tom Miller, Inc., Holly, Mich.

[21] Appl. No.: 681,878

[22] Filed: Jul. 29, 1996

Related U.S. Application Data

[63] Continuation of Ser. No. 334,345, Nov. 2, 1994, abandoned, which is a continuation-in-part of Ser. No. 145,596, Nov. 4, 1993, Pat. No. 5,425,902.

[51] Int. Cl.$^6$ ........................................ B01F 3/04
[52] U.S. Cl. .............................. 95/211; 95/227; 55/259; 55/233; 261/130; 261/133; 261/143; 261/17; 261/DIG. 34; 261/98; 261/128
[58] Field of Search ........................... 261/128, 130, 261/133, 141, 143, 17, DIG. 34, 98; 55/259, 233; 95/211, 227

[56] References Cited

U.S. PATENT DOCUMENTS

| | | |
|---|---|---|
| 1,041,617 | 10/1912 | Goodrich . |
| 2,022,740 | 12/1935 | Rowell . |
| 2,078,833 | 4/1937 | Bonner . |
| 2,092,630 | 9/1937 | Bailey . |
| 2,144,693 | 1/1939 | Seid . |
| 2,275,042 | 3/1942 | Cobb . |
| 2,633,929 | 4/1953 | Farr . |
| 2,725,224 | 11/1955 | Pierce . |
| 3,148,955 | 9/1964 | Nichols . |
| 3,186,870 | 6/1965 | Mentzer . |
| 3,275,062 | 9/1966 | Williams . |
| 3,304,011 | 2/1967 | Paasche . |
| 3,659,402 | 5/1972 | Alliger . |
| 3,855,371 | 12/1974 | Morrow et al. . |
| 3,931,371 | 1/1976 | Maurer et al. . |
| 3,963,464 | 6/1976 | Schinner . |
| 3,990,427 | 11/1976 | Clinebell . |
| 4,022,596 | 5/1977 | Pedersen . |
| 4,440,698 | 4/1984 | Bloomer . |
| 4,494,596 | 1/1985 | Bradshaw . |
| 4,618,462 | 10/1986 | Fisher . |
| 5,037,585 | 8/1991 | Alix et al. . |
| 5,061,408 | 10/1991 | Huning et al. . |

*Primary Examiner*—Tim R. Miles
*Attorney, Agent, or Firm*—Shefte, Pinckney & Sawyer

[57] ABSTRACT

A humidifier system includes a spray apparatus in a housing which sprays a mist of water droplets onto a mist eliminator to intercept the mist of water droplets. The mist of droplets is captured in a liquid phase by the mist eliminator and is substantially completely converted into a vapor phase in the form of increased humidity in the air stream. A humidity sensor located downstream of the mist eliminator senses the humidity of the stream of air. A controller controls the quantity of water sprayed in response to the humidity sensed to maintain a predetermined humidity in the humidified stream of air. A second humidifier includes a heater which creates a region of intense heat to instantaneously evaporate water mist directed thereon in a stream of air. In a third embodiment, water and pressurized air are simultaneously injected into a region of intense heat. The pressurized air rapidly expands within the region of intense heat and thereby adds energy to the system to ensure virtually complete evaporation of the water.

37 Claims, 11 Drawing Sheets

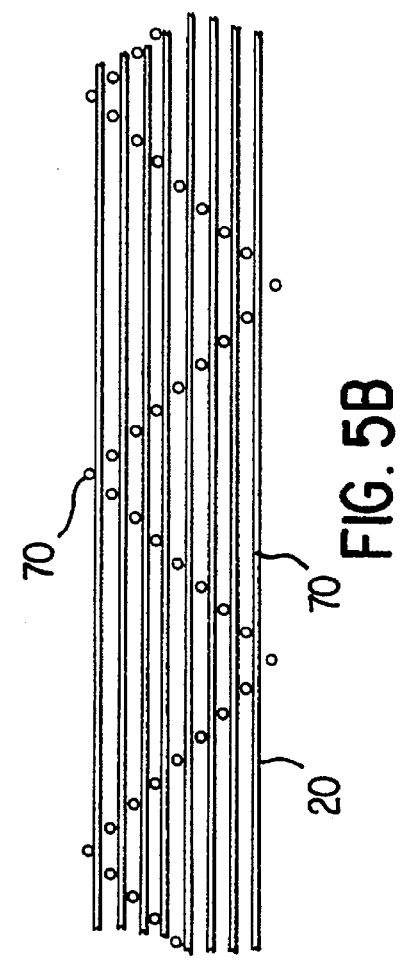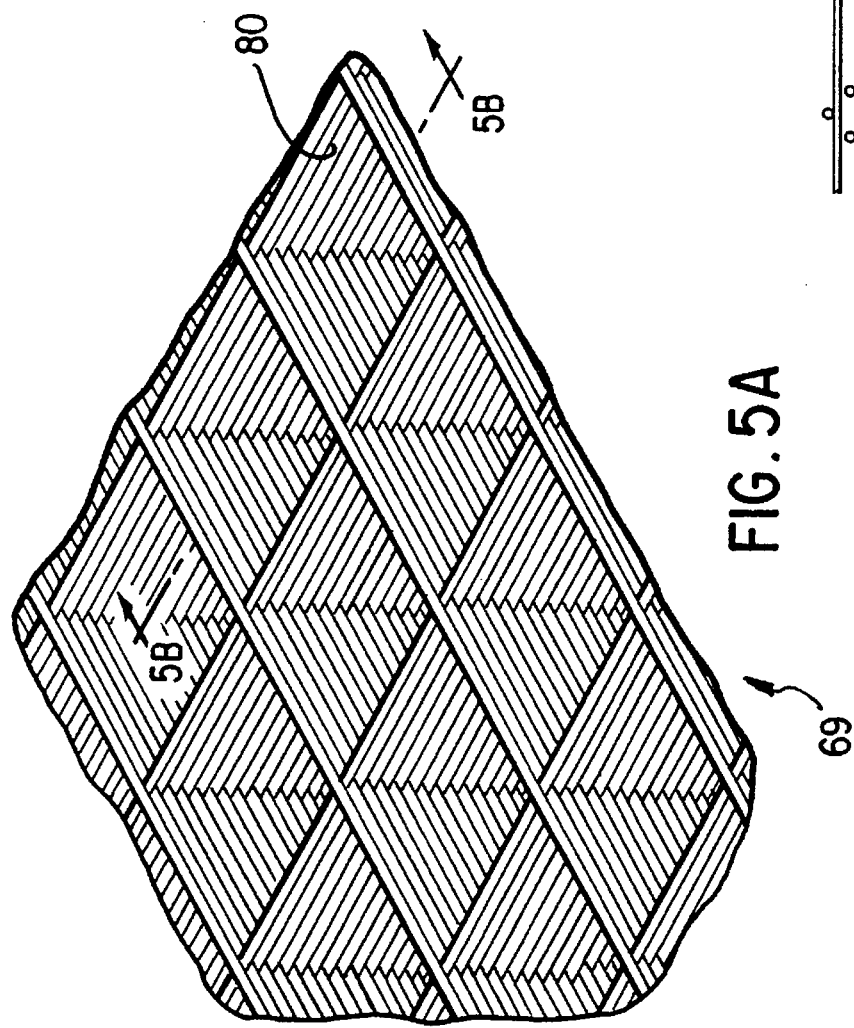

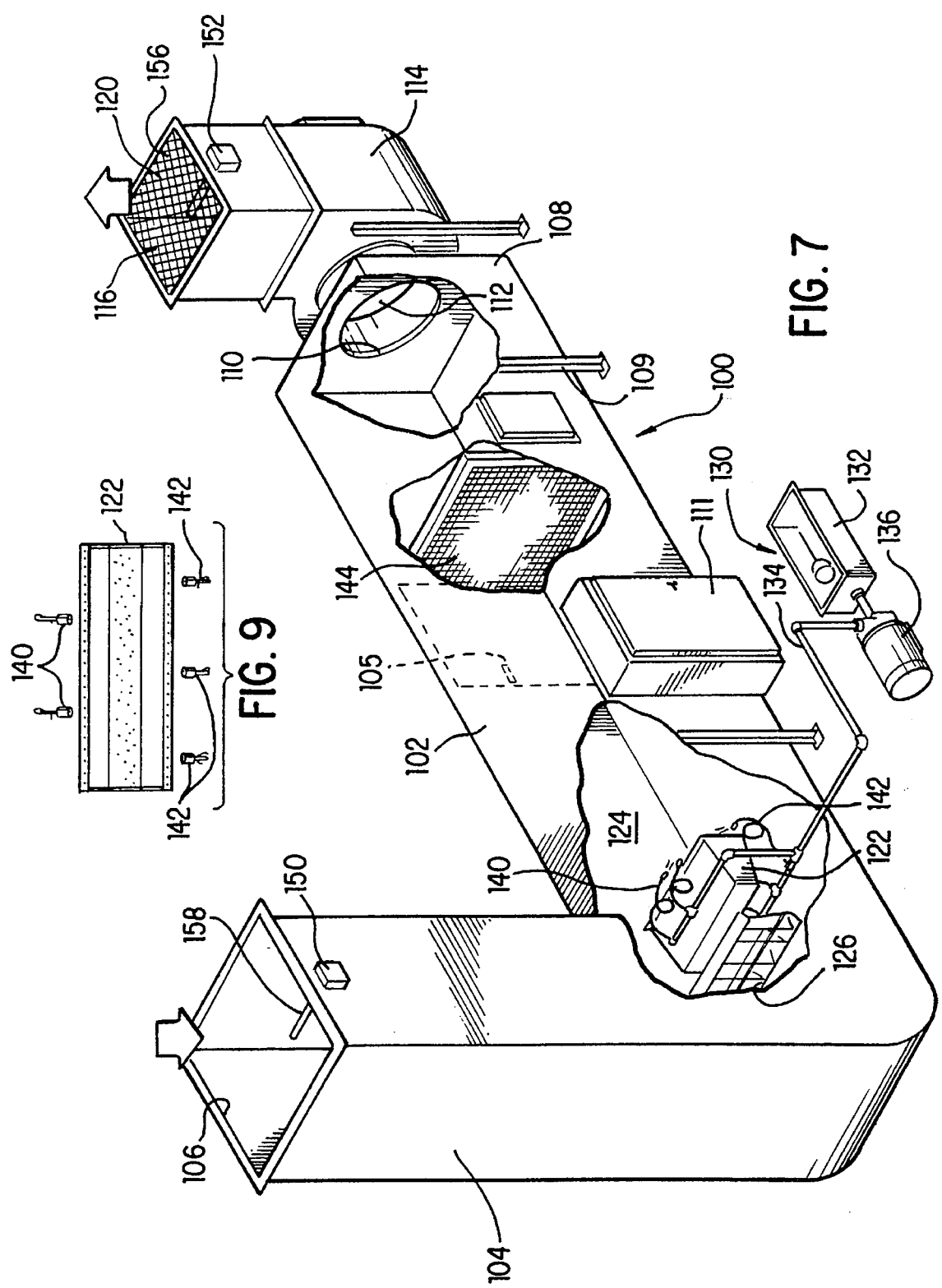

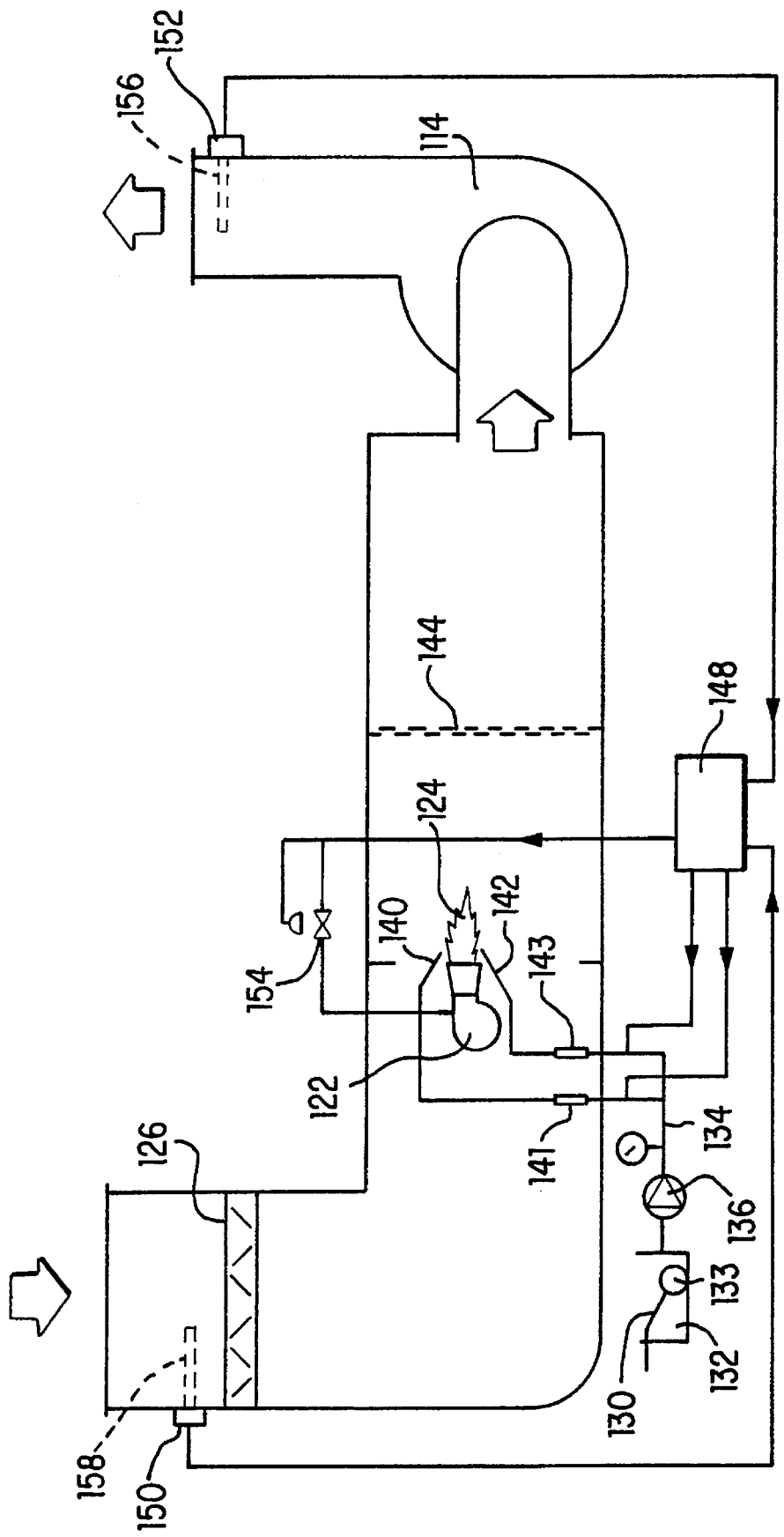

HUMIDIFIER AND METHOD FOR HUMIDIFYING AIR

This is a continuation of application Ser. No. 08/334,345, filed Nov. 2, 1994, now abandoned, which is a continuation-in-part of U.S. patent application Ser. No. 08/145,596, filed Nov. 4, 1993, now U.S. Pat. No. 5,425,902, dated Jun. 20, 1995.

BACKGROUND OF THE INVENTION

The present invention relates generally to humidifiers and methods for humidifying industrial buildings, and more particularly, to those used to humidify paint booths.

Conventional industrial air humidifiers for large buildings and paint booths often employ corrugated cardboard or glass fibers, joined by resins, as absorptive pads for storing water to be evaporated into a stream of air. These absorptive pads often are arranged in rectangular panels many feet high and several feet thick. Overhead pipes carry water which cascades down over and is absorbed by the absorptive pads. An air stream is then forced through the absorptive pads with the air stream picking up moisture to increase the humidity of the air stream.

Industrial humidifiers which utilize the above described absorptive pads have a number of problems.

First, no ensure the absorptive pads are sufficiently saturated, a great deal of water must be supplied to the absorptive pads. Consequently, a large amount of water also drains from the absorptive pads into collection trays located beneath the absorptive pads. The waste water is often treated for recirculation. This additional waste water burdens a facility's waste water treatment equipment and adds to the cost of operating the facility.

Second, in order for the absorptive pads to hold sufficient quantities of water to achieve the necessary humidification, the absorptive pads are often several feet thick. A large pressure head is needed to force the air stream through the absorptive pad. This, in turn, requires a larger fan or blower motor to develop a sufficient pressure head. Also, the large size of the absorptive pad increases the overall size of the humidifier.

Third, when the humidifier is shut down, the flow of water to the absorptive pad typically is stopped. This leads to the absorptive pad eventually drying out. A significant amount of time is necessary to then resaturate the absorptive pad during start up from a dried initial state.

Fourth, because of the massive size of the absorptive pad and the large amount of water stored therein, it is difficult to quickly and precisely adjust the humidity of the air stream exiting the humidifier to a desired level. This lack of precision can be particularly detrimental in paint booths where tight tolerances on humidity levels are critical to the proper adherence of paint to parts. Accordingly, there is a need for an industrial humidifier which can quickly and precisely adjust the humidity of an air stream.

Finally, the absorptive pads accumulate scale from the cascading water. When the pads become sufficiently encumbered with scale, the pads have to be replaced. Otherwise, particles of scale may break loose and contaminate the humidified air stream.

The present invention seeks to overcome the above-identified problems associated with conventional industrial humidifiers for buildings and paint booths which utilize large absorptive pads.

SUMMARY OF THE INVENTION

The present invention relates to a humidifier for controlling the humidity of a stream of air and a method for humidifying a stream of air. A first embodiment of the humidifier comprises a housing having an upstream inlet for receiving a stream of air to be humidified and a downstream outlet for expelling the stream of air after it has been humidified. Also, it has a spray apparatus in the housing for spraying a mist of water droplets into a stream of air. A mist eliminator, located in the housing, intercepts the mist of water droplets. The mist eliminator is comprised of elongated monofilaments interlaced and sufficiently spaced from each other such that the air stream moves freely therethrough but sufficiently close to each other so that the mist of droplets is captured in a liquid phase by the mist eliminator and substantially completely converted by flow along the monofilaments into a vapor or gaseous phase in the form of increased humidity in the stream of air.

A humidity sensor, located downstream of the mist eliminator, senses the relative humidity of the stream of humidified air. A controller controls the quantity of water sprayed into the stream of air in response to the humidity sensed to maintain a predetermined level of humidity in the stream of air expelled from the downstream outlet.

Ideally, there are a plurality of planar layers of mesh pads forming the mist eliminator including an upstream mesh pad and a downstream mesh pad, each layer being oriented generally perpendicular to the flow of the stream of air. The upstream layer may be made of a coarser mesh of monofilaments than the downstream layer whereby the upstream layer intercepts larger droplets and the downstream layer intercepts smaller droplets passing through the upstream layer. Preferably, the monofilaments are made of a non-absorbent, non-flammable material such as polypropylene or other plastics.

The spray apparatus preferably includes a plurality of spaced apart nozzles and a plurality of valves with actuators, the actuators being selectively governed by the controller to regulate the quantity of water sprayed from the nozzles. Each nozzle may spray a discrete portion of the mist eliminator wherein when all nozzles are spraying water, essentially all of the mist eliminator is covered with a mist of water droplets.

A heater is preferably provided with the amount of heat expelled from the heater being variably controlled by the controller. Further, a rinsing mechanism may be included to periodically wash scale off of the mist eliminator.

A second embodiment of the humidifier is also disclosed which includes a housing having an upstream inlet for receiving a stream of air to be humidified and a downstream outlet for expelling the stream of air after it has been humidified. A fan is in air flow communication with the housing. The fan generates a stream of air passing through the housing. A heater, also located in the housing, has a source of heat providing a region of intense heat for heating the stream of air. Water is supplied by a water supply which directs water into the region of intense heat so that the water is instantaneously evaporated or flashed into the stream of air. Humidity and temperature sensors are located downstream of the mist eliminator for sensing the humidity and temperature levels of the expelled airstream. These sensors communicate with the controller so that the controller may govern the amount of water supplied and control the amount of heat necessary to maintain the setpoint levels of humidity and temperature. This is accomplished by actuation or modulation of the water and gas valves which are in communication with the controller.

Preferably, a mist eliminator, located downstream of the heater, removes any droplets of water suspended in the air stream so that droplets of water are not expelled from the downstream outlet. Ideally, the heater is a burner which burns a combustible gas and generates a flame defining the region of intense heat. Further, the water supply includes a nozzle which directs water into the flame to evaporate the water. Further, the humidifier may include first and second temperature sensors located upstream and downstream of the heater. The temperature sensors communicate with the controller so that the controller may control the amount of heat transferred to the stream of air thereby controlling the temperature of the expelled stream of air.

A third embodiment constructed in accordance with the present invention has an upstream inlet that receives a stream of air, means for humidifying the stream of air, and a downstream outlet for expelling the humidified air. A heater is positioned to direct a flame substantially vertically downward. Pressurized water and pressurized air are supplied into the flame, causing the water to be virtually instantaneously flashed into the stream of air. The humidifier is constructed such that the airstream enters the inlet and proceeds downwardly past the heater. Just below the region where water is flashed into the airstream, the humidifier housing forces the airstream to make a right angle turn and proceed horizontally through a mist eliminator. Downstream humidity and temperature sensors are used to monitor the humidity and temperature of the expelled airstream. These sensors communicate with a controller that governs the amount of water supplied and the temperature of the heat source. The controller operates by selectively actuating water and gas valves.

The third embodiment, like the first and second embodiments, may be used to humidify air while preventing water droplets from escaping from the system. This is important because such droplets could have a detrimental effect in controlled environments such as paint booths.

A first method is taught for humidifying a stream of air which includes the following steps. A stream of air is passed downstream through a housing. Droplets of water are sprayed into the stream of air and are intercepted and coalesced on a mist eliminator. The mist eliminator preferably has interlaced elongated filaments which intercept and coalesce water droplets sufficiently to eliminate the water droplets from the stream of air. The droplets are passed along the filaments in a manner to continually renew the surfaces of the droplets so that the droplets evaporate into the stream of air. Next, the humidity of the stream of air is sensed downstream from the mist eliminator. The quantity of water sprayed on the mist eliminator is then adjusted to maintain a predetermined level of humidity downstream from the mist eliminator.

The method may further include heating the stream of air upstream from the mist eliminator thereby controlling the temperature of the stream of air. Also, the mist eliminator may be rinsed with an acidic solution to remove scale from the mist eliminator.

A second embodiment of a method for humidifying air is also disclosed. The method includes providing a region of intense heat for heating a stream of air passing thereby. A quantity of water is supplied to the region of intense heat so that the water is substantially and instantaneously evaporated into the stream of air increasing the amount of water vapor in the stream of air, thus raising the relative humidity. The humidity and temperature of the stream of air downstream of the region of intense heat are sensed. Based upon the sensed humidity and temperature, the quantity of water provided to the region of intense heat is adjusted as is the amount of heat transferred by the region of intense heat to maintain a predetermined level of humidity and temperature in the humidified stream of air. Preferably, the region of intense heat is provided by using a burner burning a combustible gas to produce a flame defining the region of intense heat.

Ideally, the quantity of water is provided by spraying droplets o water from at least one nozzle into the flame to generally instantaneously evaporate the water. Also, a mist eliminator may be provided downstream of the region of intense heat to substantially eliminate any droplets of water not evaporated from the stream of air. Therefore, the expelled stream of humidified air is generally free of droplets of water.

In a third method of operation, pressurized air is injected with water into a region of intense heat. The pressurized air assists in the evaporation process.

An object of the present invention is to provide a humidifier which uses a mist eliminator of interlaced elongated filaments to collect a spray of water droplets which are then evaporated into a stream of air.

A further object is to provide a humidifier which utilizes water directed to a region of intense heat to substantially completely and instantaneously evaporate the water into a stream of air.

An additional object is to use a mist eliminator to remove air droplets from a stream of humidified air so that the water droplets cannot adversely affect an environment such as a paint booth.

It is yet another object to provide an industrial humidifier which uses an evaporative pad that does not absorb water and which can rapidly and accurately supply a large quantity of air humidified to within ±1% relative humidity over a wide range of relative humidities and can do so in just a few minutes with little or no start-up time involved.

It is a further object to provide a humidifier which produces relatively little waste water as compared to conventional industrial humidifiers having a similar output capacity.

Another object is to provide a humidifier which produces only a relatively small static pressure loss in an air stream passing therethrough thereby requiring only a relatively small fan or blower motor to generate the air stream.

It is still yet another object to provide a humidifier which is more compact than conventional industrial humidifiers of similar output capacity.

An additional object is to provide a humidifier having a washing mechanism for removing scale from an evaporative pad so that scale build-up is minimized thereby extending the working life of the evaporative pad.

Another object of the invention is to add energy to water injected into a region of intense heat to enhance the evaporation of the water. In a preferred embodiment of the invention, pressurized air is employed to add energy to the injected water.

Other prior art humidifiers of comparable size to the present invention use large quantities of water, which must be purchased and subsequently cleaned. Virtually no water is wasted in the present invention, thereby reducing the cost of operating by reducing the amount of water purchased and the cost of cleaning the water used. Furthermore, since no water is wasted, it is unnecessary to add biocides to the water to prevent biological growth incident with moisture.

Other objects of the present invention will become apparent from the following description and drawings which illustrate preferred embodiments of the present invention.

BRIEF DESCRIPTION OF THE DRAWINGS

FIG. 5A is a fragmentary perspective view of a layer of a mesh pad from FIG. 4;

FIG. 5B is a sectional view taken along line to 5B—5B of FIG. 5A;

FIG. 7 is a perspective view, partially in cutaway, of a second embodiment of the present invention;

FIG. 8 is a schematic view illustrating the operation of the humidifier of FIG. 7;

FIG. 9 is a front elevational view of a burner being surrounded by a plurality of water nozzles;

DETAILED DESCRIPTION OF PREFERRED EMBODIMENTS

Figure 1:
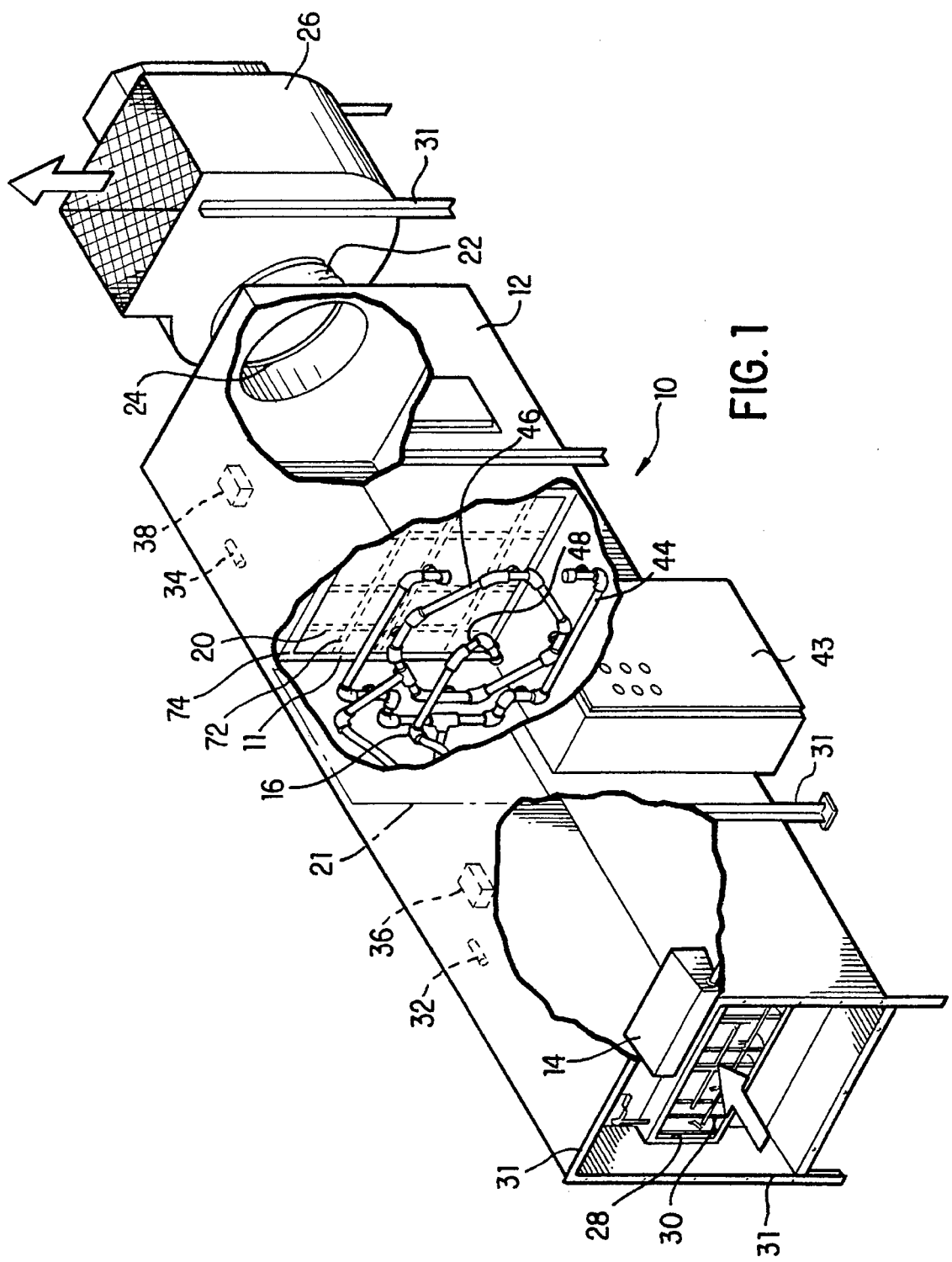
FIG. 1 is a perspective view, partially in cutaway, of a humidifier made in accordance with a first embodiment of the present invention.

Turning now to the drawings, where like reference numerals indicate like elements, there is shown in FIG. 1 a humidifier 10 constructed in accordance with a first embodiment of the invention. The humidifier is arranged to heat and humidify a stream of air passing longitudinally downstream therethrough. A pair of arrows indicate the direction of air flow. Humidifier 10 includes a housing 12 supporting a heater 14, and a spray apparatus 16 which sprays water droplets upon a mist eliminator 20. An access door 21 in housing 12, shown in phantom lines, provides access to mist eliminator 20 and spray apparatus 16. A flexible duct 22 connects an outlet 24 in housing 12 with a blower or fan 26. Housing 12 has inlet 28 at its upstream end with a damper 30 therein for closing off inlet 28 and partially regulating the air flow through humidifier 10. Housing 12 is made up of a plurality of metal sheets appropriately joined together to form a longitudinally extending rectangular conduit. Steel struts 31 provide a framework supporting the metal sheets.

A control box 43, enclosing a controller 42, is attached to the outside of housing 12.

Preferably heater 14 is a burner which burns a combustible gas and is available from Eclipse Combustion of Rockford, Ill., Model No. AH.

Also located within housing 12 are a pair of temperature sensors 32 and 34 and a pair of humidity sensors 36 and 38. Sensors 32 and 36 are located between heater 14 and mist eliminator 20. Sensors 34 and 38 are located downstream of mist eliminator 20. For purposes of this application, humidity sensors 36 and 38 are sensors that generally are responsive to the amount of water vapor present in the stream of air. Sensors 36 and 38 may measure relative humidity, dew point or the like. However, preferably, the quantity evaluated is relative humidity. While shown separately, in this preferred embodiment, the upstream and downstream temperature and relative humidity sensors are actually combined in single humidistat units.

Figure 6:
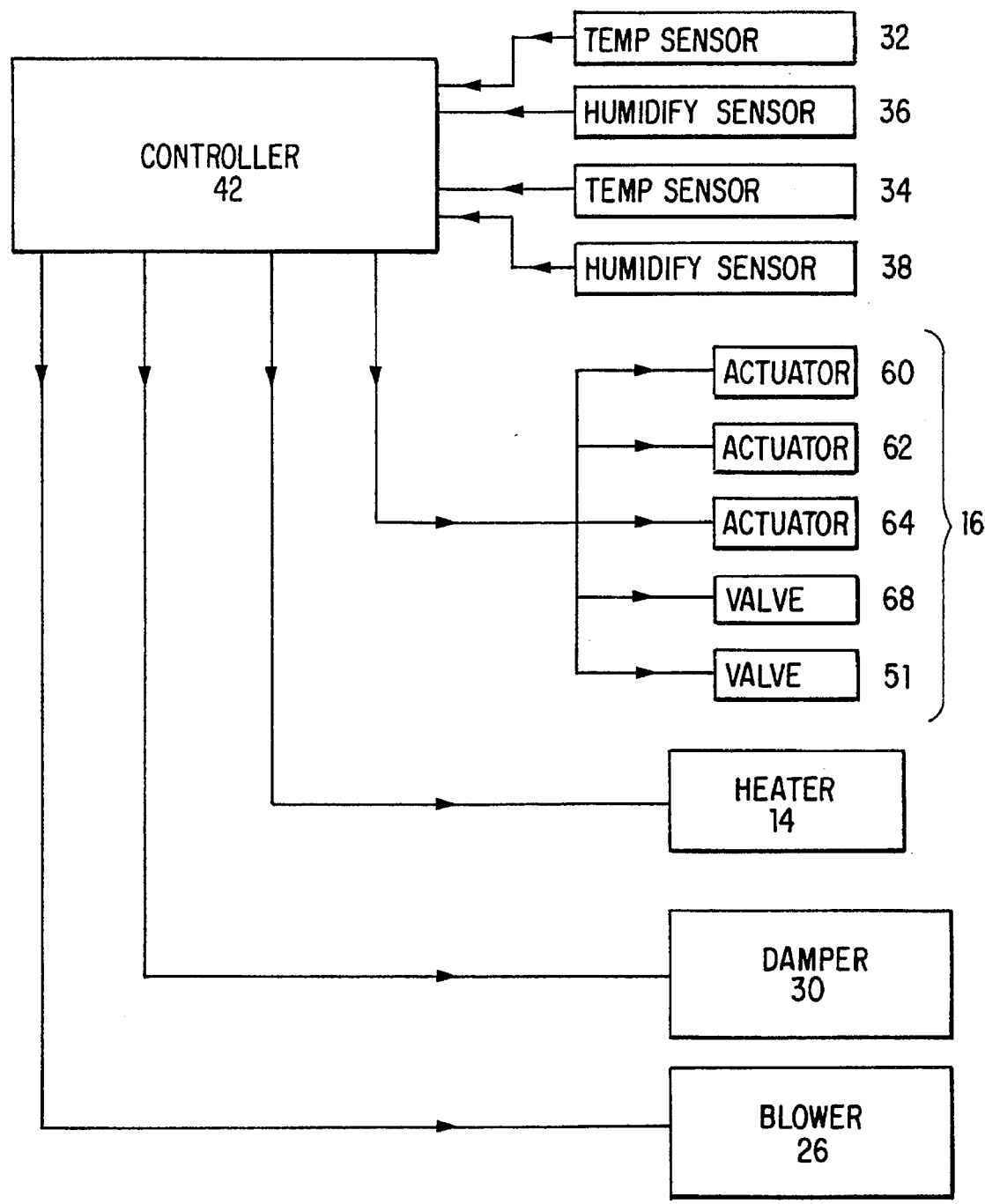
FIG. 6 is a schematic view of active components of the humidifier communicating with a controller.
Figure 10:
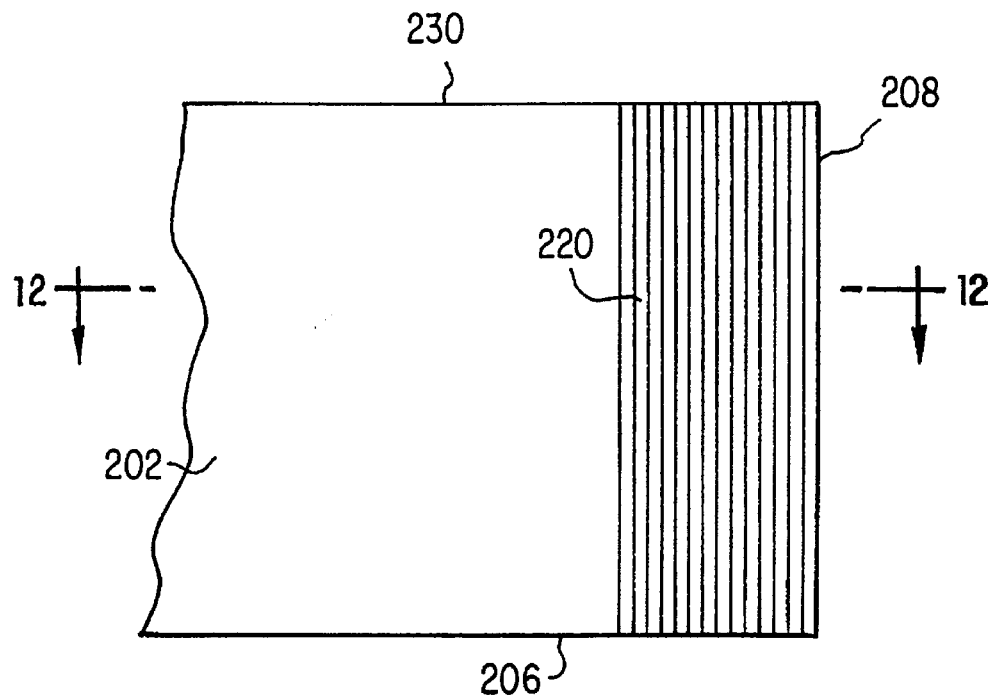
FIG. 10 is a top view of a humidifier system constructed in accordance with another preferred embodiment of the present invention.
Figure 11:
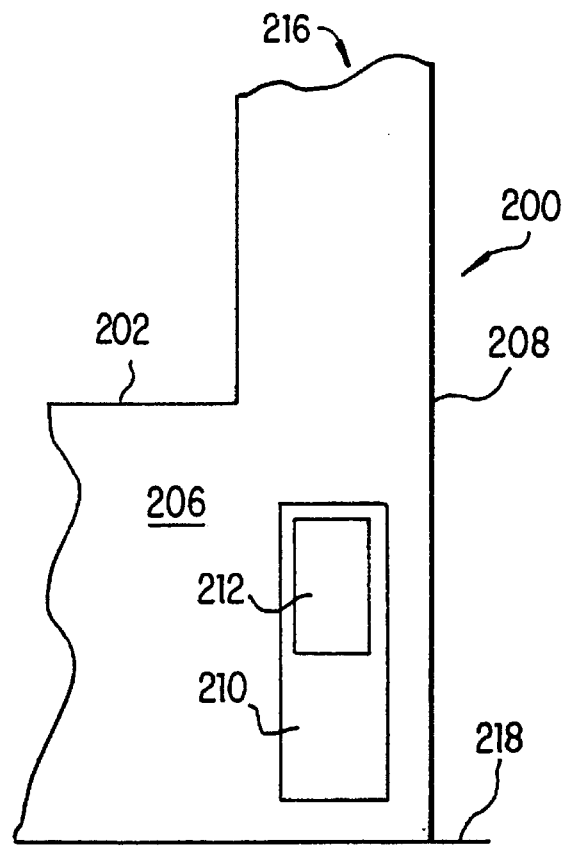
FIG. 11 is a rear view of the humidifier system of FIG. 10.

Controller 42, as shown in FIG. 6, controls the operation of humidifier 10. In particular, controller 42 receives input from sensors 32, 34, 36 and 38 and outputs signals to heater 14, damper 30, spray apparatus 16, and blower 26 to control the humidity and temperature of air exiting humidifier 10. Further, controller 42 also controls a plurality of solenoid actuated valves as described below.

Figure 2:
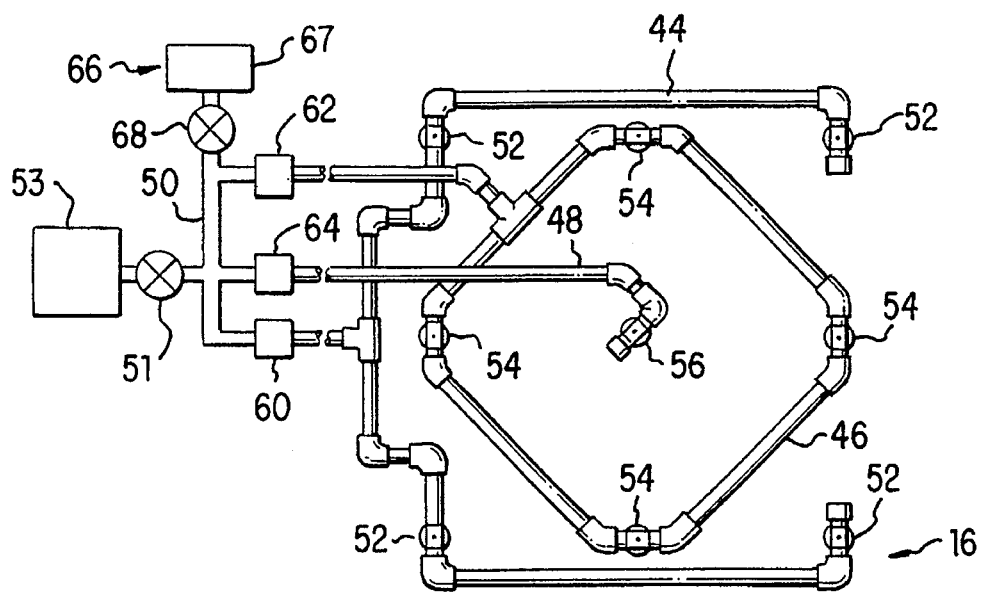
FIG. 2 is an elevational view of a spray apparatus used in the humidifier of FIG. 1.
Figure 3:
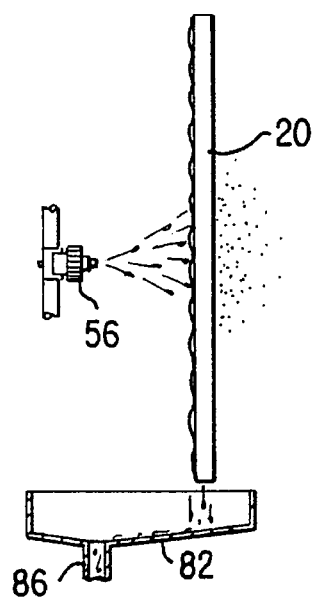
FIG. 3 is a fragmentary cutaway view of a nozzle of the spray apparatus spraying water onto a mist eliminator with unevaporated water draining into a collection tray.

Spray apparatus 16, as best seen in FIGS. 1 and 2, includes first, second and third conduits 44, 46 and 48 which carry water and are in fluid communication with respective spray nozzles 52, 54 and 56. A connecting conduit 50 fluidly joins conduits 44, 46 and 48 to a pressurized water supply 53 by way of a valve 51.

First conduit 44 is C-shaped with nozzles 52 located at corners of the rectangular configuration. Second conduit 46 is diamond shaped with nozzles 54 being disposed at each of its corners. Finally, third conduit 48 carries a single nozzle 56 which is situated in the center of first and second conduits 44 and 46. When all of nozzles 52, 54 and 56 are active, they provide a spray pattern which generally covers all of mist eliminator 20. It will be appreciated that different configurations of nozzle layouts are possible which still insure that most of mist eliminator 20 is covered by sprays of water droplets. Also, different types of nozzles can be employed to produce water droplets having different maximum sizes.

First, second and third conduits 44, 46 and 48 are connected to water supply 53 through respective actuators 60, 62 and 64, each of which has an electrically controlled solenoid valve for varying the amount of water supplied to respective conduits 44, 46 and 48. Controller 42 individually controls the actuators 60, 62 and 64 of spray apparatus 16 thereby regulating the quantity of water expelled by nozzles 52, 54 and 56. Any one, two or three of actuators 60, 62 and 64 may be activated to provide the appropriate amount o water to achieve a desired relative humidity level downstream of mist eliminator 20.

Nozzles 52, 54 and 56 are available from Bete Fog Nozzle, Inc. of Greenfield, Mass., Model PJ15, stainless steel.

Spray apparatus 16 also has a washing apparatus 66 for removing scale from mist eliminator 20. Washing apparatus 66 includes a tank 67 for storing an acid solution (such as a mild sulfuric acid solution $H_2SO_4$) and a solenoid operated valve 68 which is in fluid communication with connecting conduit 50 and nozzles 52, 54 and 56. Water from water supply 53 is shut off using valve 51 when valve 68 is opened to allow the acid solution to spray on mist eliminator 20. This acidic spray rinses scale off of mist eliminator 20. Valves 51 and 68 are also controlled by controller 42.

Mist eliminator 20 is comprised of a plurality of layers of interconnected mesh pads 76 and 78 mounted on a rectangular frame 71. A plurality of horizontal and vertical support bars 72, as seen in FIG. 1, are attached to rectangular frame 1. Plastic ties (not shown) are used to secure mesh pads 76 and 78 to support bars 72. Frame 71 is slidably inserted and mountable within housing 12 and is easily removable. Support bars 72 are preferably stainless steel, however, they may also include fiber-reinforced plastic, aluminum or a variety of materials providing high strength and low weight.

Figure 4:
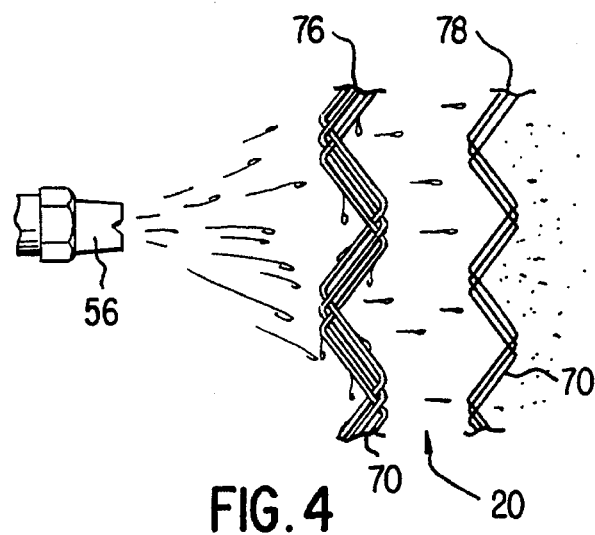
FIG. 4 is a fragmentary schematic view of water droplets passing through first and second layers of mesh pads with water coalescing upon and evaporating from the mesh pads.

Turning now to FIGS. 4, 5A and 5B, FIG. 4 schematically shows a portion of the pair of generally planar, longitudinally spaced mesh pads 76 and 78 which are oriented perpendicular to the flow of the stream of air. Preferably, mesh pads 76 and 78 are constructed in accordance with U.S. Pat. No. 4,022,596 (Pedersen), the entire disclosure of which is incorporated herein by reference. Mesh pads 76 and 78 are manufactured by and are available from Kimre Incorporated of Perrine, Fla. In particular, model B-Gon Mist Eliminator Pads are used.

FIG. 5A illustrates that mesh pads 76 and 78 are comprised of interlaced filaments 70 forming a matrix of pyramid-like squares 80. Parallel rows of filaments 70 run orthogonally to other parallel rows of filaments 70, as indicated in FIG. 5B. This particular construction of interwoven filaments 70 provides a high void fraction which allows a stream of air to easily pass therethrough while also providing a high removal efficiency of the sprayed water droplets. Removal efficiency is the fraction of liquid droplets passing through the mesh pad which are captured. Void fraction is the volume of free space in a pad relative to the overall volume of space the pad occupies.

While meshes as described are preferred, other meshes having interlaced or interconnected filaments or the like, which also efficiently remove water drops without creating a significant pressure head loss, are also within the scope of this invention. Filaments 70 are preferably manufactured from plastic, and most preferably from polypropylene. Other materials, ideally non-flammable, may also be used to form mesh pads 76 and 78.

As shown schematically in FIG. 4, mist eliminator 20 includes two or more layers of pads aligned generally perpendicular to the flow of the air stream through humidifier 10. The upstream mesh pad 76 is made of a coarser mesh of filaments 70 than is downstream layer 78. Further, filaments 70 of upstream mesh pad 76 are preferably larger in diameter than those of downstream mesh pad 78. While only two layers of mesh pads 76 and 78 are shown for exemplary purposes in FIG. 4, ideally, four or five layers of these planar mesh pads will actually be used in this first embodiment. The coarseness of the meshes and void fractions of the mesh pads will decrease from the upstream to the downstream direction.

Depending on the use of humidifier 10, more and finer layers of mesh pad may be used to increase the removal efficiency of the mist eliminator 20. For example, with vehicle paint booths, very high removal efficiencies are desirable. For only general humidification purposes, mist eliminators may have a much lower removal efficiency.

The following is a predicted mechanism for the humidification process. Water droplets from one or more of nozzles 50, 52 or 54 are sprayed upon mist eliminator 20. Larger water droplets are intercepted by upstream layer 76 and coalesce along filaments 70. Smaller water droplets pass through the coarser upstream layer 76 and are intercepted and removed by downstream layer 78. Due to gravity, the coalesced water droplets move downwardly along vertically extending filaments 70. Also, due to adherence, the coalesced water droplets also travel along horizontally extending filaments 70.

As the water droplets move along the filaments 70 and encounter intersections of filaments 70, the outer surface of the water droplets are constantly undergoing surface renewal. That is, the water droplets are churned with the interior portions of the water droplets being transferred to the outer surfaces of the droplets, and water molecules located on the water droplets exterior surfaces being transferred inwardly. Therefore, virtually all portions of the water droplets are exposed to the warm stream of air passing through mist eliminator 20. This constant surface renewal enhances the evaporation of the water droplets increasing the humidity of the stream of air.

As the stream of air carrying the water droplets flows over each individual filament 70, mist eliminator 20 forms rotating eddies in the air stream behind or in the direction away from the movement of the air stream being treated in relation to filaments 70. These eddies, therefore, move in the direction of the bulk flow of the stream of air being treated and are, in turn, encountered by subsequent perpendicularly positioned filaments 70. Because of this and because of the substantial increase in the number and length of the individual filaments 70 which provide this effect, the stream of air is constantly subjected to this kind of rotating contact. This contact has the effect of increasing the exposure of the stream of air for evaporation and removal of liquid-state water droplets.

Ideally, all of the water droplets are evaporated into the stream of air to achieve a desired humidity level in the stream of air exiting humidifier 10. However, as a practical matter, not all the water droplets are evaporated. Some droplets fall downwardly into a collection tray 82. Tray 82 connects to an outlet drain 86 which, in turn, is connected with either a storage tank or a water treatment system (neither of which is shown) or drained to waste.

Preferably, all the water droplets passing through mist eliminator 20 are intercepted by mesh pads 76 and 78. If water droplets are allowed to escape from humidifier 10, these water droplets may have a detrimental effect in environments such as paint booths where the water droplets can cause an adherence problem between paint and parts to be painted.

Consequently, mist eliminator 20 is designed to remove a high percentage of the water droplets sprayed from spray apparatus 16. Utilizing finer meshes and smaller diameters of filaments, along with using a greater number of layers of pads in mist eliminator 20, the percentage of the water droplets removed can be increased. However, a greater pressure head will then be needed to move the stream of air through mist eliminator 20. Also, the faster the stream of air passing through mist eliminator 20, the lower the removal efficiency. Therefore, the velocity of air flow through humidifier 10 should be limited to acceptable levels so that adequate removal of water droplets occurs. Preferably, the air flow velocity will be limited to less than 500 feet per minute.

In operation, a predetermined amount of air is drawn into humidifier 10 by adjusting damper 30 and the speed of blower 26. The air stream passes by and is heated by heater 14. This heating dries the air to a predetermined temperature and humidity which is checked by upstream temperature and humidity sensors 32 and 36. Signals are then relayed from sensor 32 and 36 to controller 42. The temperature and humidity are also checked downstream by temperature and humidity sensors 34 and 38 with those signals also being input to controller 42.

One, two, or all three of actuators 60, 62 or 64 are selectively opened resulting in water droplets being sprayed upon mist eliminator 20. Heater 14 and the water flow from spray apparatus 16 are adjusted in response to the sensed parameters of sensors 32, 34, 36 and 38 to quickly and accurately achieve predetermined humidity and temperature levels in the expelled stream of air.

When a predetermined amount of scale on mist eliminator 20 has accumulated, blower 26 and valve 51 are shut off and valve 68 is opened. A supply of the mild acidic solution is released through valve 68, actuators 60, 62 and 64, and nozzles 52, 54 and 56. The acidic solution is collected by mist eliminator 20 thereby placing the scale in solution. The scale laden acidic solution then drains into collection tray 82. Consequently, mist eliminator 20 need be replaced less frequently than in an apparatus not having this scale-removing feature. If excessive scale is allowed to build up, the scale may break free from mist eliminator 20 and contaminate the stream of air.

Based upon varied sensed levels of temperature and humidity, the output of spray apparatus 16 is adjusted to achieve a desired temperature and humidity output from humidifier 10. Likewise, varying the thickness and types of pads forming mist eliminator 20 can be used to optimize pressure head drop and removal efficiency. Because water droplets adhere to mist eliminator 20 rather than being absorbed as with conventional absorptive pads, output humidity levels can be rapidly and accurately adjusted to precise levels, preferably in the range of ±1% relative humidity. Using humidifier 10, virtually all of the sprayed water is evaporated. Therefore, relatively little water is drained into collection tray 82. This minimizes the amount of water which must subsequently be treated by a waste water treatment plant. Further, humidifier 10 is ready to operate immediately without a need to saturate a large absorbent pad as in conventional humidifiers.

A second embodiment constructed in accordance with the present invention is shown in FIG. 7. Humidifier 100 includes a housing 102 connected to an inlet conduit 104 which has an inlet 106 for receiving a stream of air. The downstream end of housing 102 has an outlet 110. Flexible conduit 112 connects outlet 110 with a fan or blower 114. Blower 114 has a screen 116 located in a rectangular outlet 120. Housing 102 is again made up of metal sheets 108 attached to steel struts 109. A door 105 provides access to the interior of housing 102. A control box 111 is attached to housing 102.

To heat the stream of air passing through humidifier 100, a heater 122 is provided in the upstream end of housing 102. Heater 122 projects a flame 124 to heat the passing stream of air. It will be appreciated that any comparable heater which provides an intense region of heat which can receive water and which can relatively instantaneously evaporate or flash the water from a liquid to a gaseous state, can be used in place of heater 122. The amount of heat provided by heater 122 to the stream of air is controlled by a controller 148, located within control box 111, through the operation of a gas valve 154. Located upstream of heater 122 is a damper 126 which again controls the size of the opening into the upstream end of housing 102.

A water supply 130 provides water to heater 122. A reservoir 132 maintains a reserve of water. A float and valve assembly 133 ensures that reservoir 132 has a ready supply of water to be pumped to heater 122. Conduit 134 carries water from reservoir 132 to heater 122. A pump 136 is used to pressurize the water in conduit 134. In the preferred embodiment, this pressure is maintained at a constant pressure of approximately 200 psi. Located at the distal end of conduit 134 are a plurality of spray nozzles 140 and 142. Spray nozzles 140 and 142 are arranged to direct their spray of water into the centerline of flame 124. As the spray from spray nozzles 140 and 142 meets flame 124, the water is substantially instantaneously evaporated or flashed from a liquid phase into a vapor phase thereby adding water vapor to the stream of air.

Nozzles 140 and 142, as shown in FIG. 9, are preferably spaced six inches on center along the transverse length of heater 122. For example, with a twenty foot long heater, 40 nozzles 140 and 142 would be used. Also, as shown, nozzles 140 and 142 are arranged alternatively above and below heater 122. The nozzles are ideally operated to provide a maximum of 0.1 gpm (gallon per minute) per nozzle.

Located mid-length along housing 102 is a mist eliminator 144. Preferably, mist eliminator 144 again uses the mesh pads as described in the first embodiment. However, as essentially all of the water sprayed from spray nozzles 140 and 142 is instantaneously evaporated when it encounters flame 124, preferably, only a couple of layers of the mesh pads need be used to achieve a desired removal efficiency. Also, a smaller pressure head drop across mist eliminator 144 occurs as compared to the thicker mist eliminator 20 of the first embodiment.

Upstream and downstream humidistats 150 and 152, having probes 158 and 156 extending transversely into inlet conduit 104 and blower 114, are used to sense temperature and relative humidity. Alternatively, these humidistats may also be remotely located downstream of housing 102 (for example in the paint booth or space to be heated and humidified). However, they should be sufficiently close to get an accurate reading for relative humidity and temperature of the stream of air passing through humidifier 100. This allows quick response of the controller to sensed air conditions. If the air flows through housing 102 at an excessive speed, spray from nozzles 140 and 142 may be blown downstream prior to being completely evaporated by flame 124. Accordingly, the maximum speed of the stream of air is controlled by the operation of blower 114 in cooperation with damper 126 to prevent excessive entrainment of water droplets in the stream of air. Also, if water droplets are driven through mist eliminator 144 at an excessive speed, the water droplets may not be effectively removed. Again, it is preferable to limit the air flow velocity to less than five hundred feet per minute through the mist eliminator 144.

In operation, heater 122 receives a combustible gas from valve 154 to heat the stream of air. Concurrently, blower 114 is operated to create a stream of air passing through humidifier 110 at a predetermined velocity. Humidistat 152 checks the expelled relative humidity and temperature of the stream of air. Likewise, humidistat 150 evaluates the upstream relative humidity and temperature. Humidistats 150 and 152 then send representative signals to controller 148.

Water from reservoir 132 is pumped to nozzles 140 and 142 to increase the humidity of the stream of air. As the water droplets sprayed from nozzles 140 and 142 encounter flame 124, the water droplets are transformed from a liquid to a gaseous state.

Any droplets of water not evaporated by flame 124 are entrained in the stream of air and are captured by mist eliminator 144. As described in the first embodiment, the water droplets are then evaporated from mist eliminator 144 with little or no water escaping from humidifier 100 in a liquid state.

Controller 148, in response to inputs from humidistats 150 and 152, adjusts heater 122 and water supply valves 141 and 143 to achieve a predetermined relative humidity and temperature in the air stream exiting humidifier 100. The washing mechanism of the first embodiment may also be used on this second embodiment.

A third humidifier system 200 constructed in accordance with the present invention is shown in FIGS. 10 through 15. The system 200 includes a housing 202 with a floor 204 (FIG. 12), a rear wall 206, a back wall 208 and a door 210. The door 210 opens through the rear wall 206 to provide access to the interior of the housing 202. The door 210 has a window 212. The floor 204 slopes downwardly toward a water collection tray 214. The tray 214 is located at the lowest point of the floor 204. The housing 202 is preferably formed of a plurality of metal sheets joined together to form an elongated, rectangular conduit, similarly to the humidifier systems shown in FIGS. 1–9.

The humidifier housing 202 defines an inlet 216 for receiving air to be humidified. The housing 202 may be positioned on or adjacent to a building 218 such as an automobile manufacturing plant. The air entering the inlet 216 may be ambient air from outside of the building 218.

A louvered vent 220 is located within the inlet 216. Air is drawn through the housing 202 by a fan 114 (FIG. 7) located near the housing outlet 120. The fan 114 and outlet 120 are not shown in FIGS. 10 through 15. Baffles 222, 224, 226, 228 (FIG. 12) are provided within the housing 202 to further control the flow of air through the housing 202. The baffles 222, 224, 226, 228 extend essentially the full width of the humidifier system 200 (i.e., from the rear wall 206 to the front wall 230 shown in FIG. 10).

Figure 12:
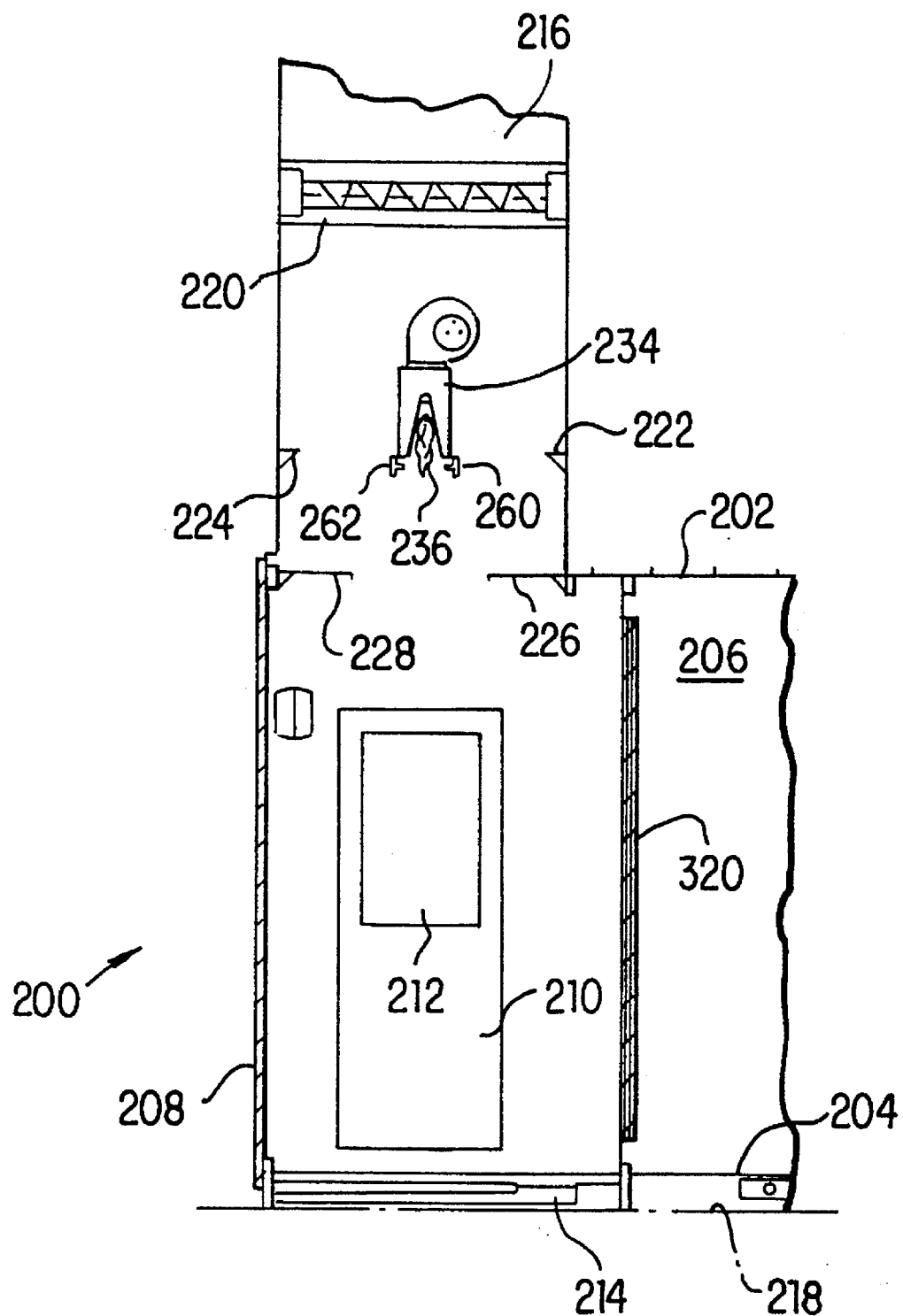
FIG. 12 is a cross sectional view of the humidifier system of FIG. 10, taken along the line 12—12.

A heater 234 (FIG. 13) for generating a region of intense heat is located within the inlet 216. In the illustrated embodiment, the heater 234 burns natural gas and the region of intense heat is the resulting flame 236 (FIG. 15). The heater 234 is similar in structure and operation to the heater 122 shown in FIG. 8. The heater 234 (FIG. 15) has an opening 238, diffuser plates 240, 242 with openings 244 (FIG. 14), and a fan 246 for causing air mixed with combustible gas to flow through the openings 244. The flame 236 is produced by igniting the gas within the opening 238. As shown in FIG. 12, the heater 234 is positioned such that the flame 236 projects substantially vertically downward.

Figure 14:
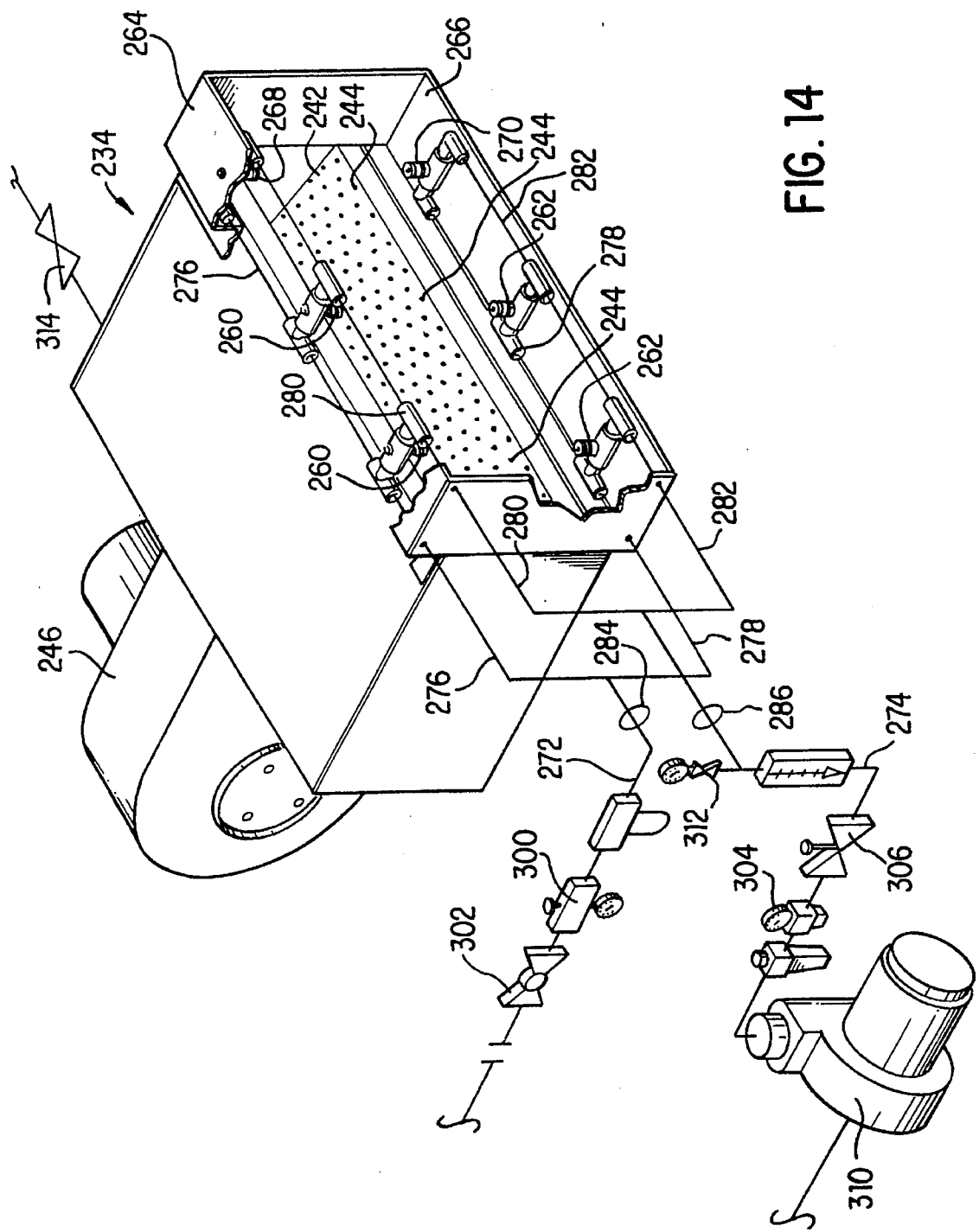
FIG. 14 is an enlarged cross sectional view of the heater shown in FIG. 13, taken along the line 14—14.
Figure 15:
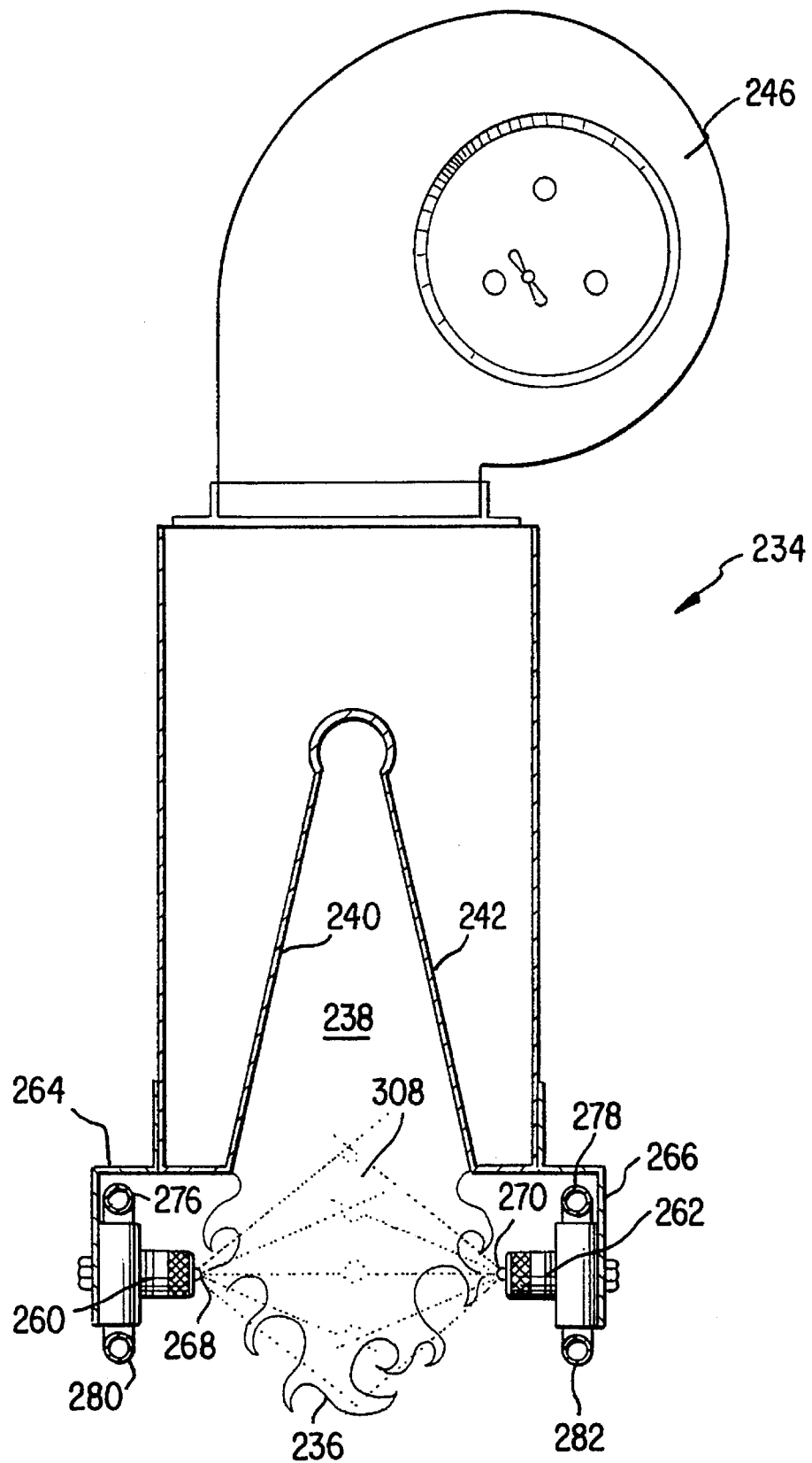
FIG. 15 is a schematic view illustrating the heater shown in FIGS. 12 through 14 along with means for supplying water and pressurized air to the heater.

Stainless steel or plated brass nozzles 260, 262 are attached to the heater 234 by brackets 264, 266 (FIG. 14). The nozzles 260, 262 have openings 268, 270 located near the flame 236. The openings 268, 270 project toward the flame 236. A water conduit 272 and an air conduit 274 are connected in parallel to each nozzle 260, 262, preferably by connecting conduits 276, 278, 280, 282. The water and air conduits 272, 274 enter the housing 202 through openings 284, 286 in the front wall 230.

A water pressure gauge 300 is connected to the water conduit 272. The gauge 300 monitors the pressure of the water entering the nozzles 260, 262. To adjust the flow of water through the nozzles 260, 262, a water supply valve 302 is also provided on the conduit 272. The valve 302 may be controlled manually or automatically responsive to humidity sensed by a downstream sensor 152, as discussed in more detail below. Water may be supplied to the conduit 272 by a reservoir and pump system 132, 136 similarly to the first and second embodiments. The reservoir and pump system 132, 136 is not shown in FIGS. 10 through 15.

An air pressure gauge 304 is connected to the conduit 274 to monitor the pressure of the air entering the nozzles 260, 262. In the illustrated embodiment, the air pressure within the conduit 274 is maintained within a range of about twenty to forty pounds per square inch (psig). An air supply valve 306 is also connected to the conduit 274. In a preferred embodiment of the invention, the air pressure remains constant at the desired pressure. In the preferred embodiment, the ratio of air to water in the sprayed air/water mixture 308 (FIG. 15) is controlled by controlling the water valve 302. Nevertheless, the air valve 306 is provided to make it possible to change the air pressure if desired, and to turn off the supply of air altogether. The air conduit 274 is connected to a pressurized air supply 310. A pressure relief valve 312 is provided for venting excessive pressure from the air conduit 274.

In operation, the air/water mixture 308 (FIG. 15) is sprayed through the nozzle openings 268, 270 and into the flame 236. The flame 236 instantaneously evaporates the water entrained within the air/water mixture 308, thereby increasing the humidity of the airstream flowing downwardly around the heater 234. The pressurized air from the air conduit 274 assists in the evaporation process by adding energy to the sprayed water. As the pressurized air exits the nozzles 260, 262, it rapidly expands. This expansion transfers energy to the water evaporation process.

Unlike prior art humidifiers, the present invention (particularly the second and third embodiments disclosed herein) may have an almost instantaneous reaction time for responding to changes in temperature and/or humidity. If a change in humidity at the outlet 120 is sensed, the water supply valve 302 is actuated immediately to return the humidity level at the outlet 120 to the desired level. If a change in temperature at the outlet 120 is sensed, a gas control valve 314 (FIG. 14) is actuated immediately to return the air temperature at the outlet 120 to the desired level.

For example, when the downstream humidistat 152 senses a level of humidity below a desired level, the controller opens the water supply valve 302. This causes an increase in the amount of water injected into the flame 236, which rapidly increases the humidity of the air at the outlet 120 back to the desired predetermined level.

Moreover, the system 200 may be controlled such that increasing and decreasing the amount of water supplied to the flame 236 does not reduce the temperature of the air exiting the system 200. Also, the system 200 may be controlled so that the temperature at the outlet 120 is maintained regardless of changes in the temperature of the ambient air at the inlet 216. In particular, if the temperature sensed at the outlet 120 decreases, the gas valve 314 is opened wider to increase the amount of gas supplied to the heater 234, to thereby rapidly bring the temperature of the humidified air back up to the desired level. If the temperature sensed at the outlet 120 becomes higher than the desired temperature, then the amount of gas supplied to the heater 234 is decreased by partially closing the gas valve 314, such that the temperature of the conditioned air at the outlet 120 rapidly returns to the desired level.

With the present invention, the desired temperature and humidity conditions for the air exiting the system 200 may be preset and/or changed at will over wide temperature and humidity ranges. Moreover, the temperature and humidity of the air exiting the system 200 may be automatically controlled within close tolerances regardless of the temperature and humidity conditions at the inlet 216 and outlet 120.

Figure 13:
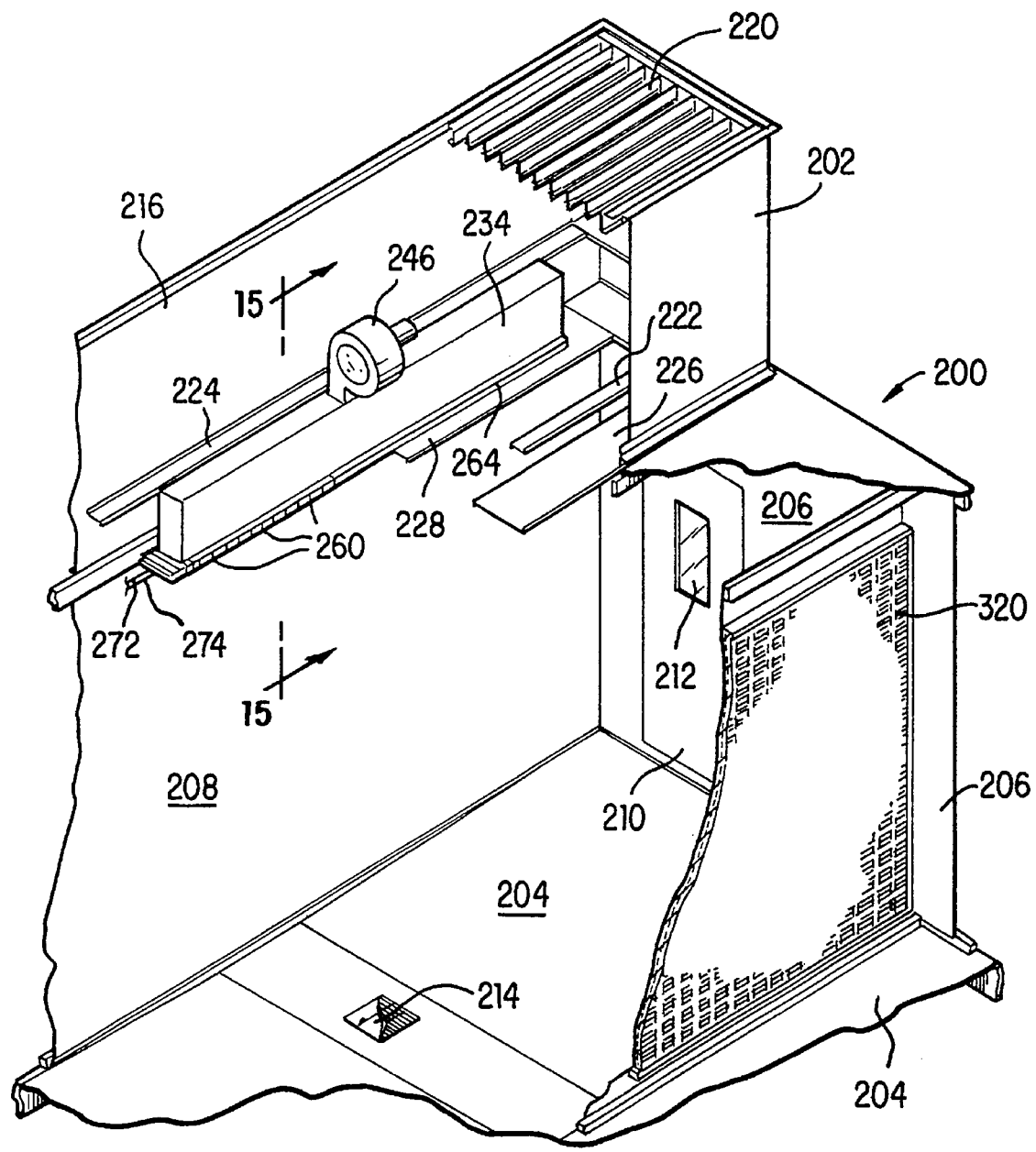
FIG. 13 is a perspective view, partially in cutaway, of the humidifier system of FIG. 10.

The humidifier system 200 advantageously prevents any water droplets from passing through the outlet 120 into the work area. First, the heater 234 is positioned such that the flame 236 projects downwardly in the direction of the airstream. Thus, any water not flashed by the flame 236 is pulled downwardly by gravity and inertia and is collected in the tray 214. Second, the flow rate of the airstream (controlled by the blower 114) is relatively slow throughout the humidifier 200. As a consequence, the air flow does not tend to blow water away from the flame 236. This ensures that substantially all droplets are evaporated within the flame 236. Third, any droplets of unevaporated water not evaporated by the flame 236 will be collected by a downstream mist eliminator 320 (FIGS. 12 and 13). In practice, the evaporation process within the flame 236 should be so complete that droplets of water never reach the mist eliminator 320 except when the system 200 is first started up.

The spacing of the nozzles 260, 262 is preferably within a range of about four to six inches on center across the width of the heater 234.

The term "humidity sensor" as used in this application and in the claims, refers to sensors which evaluate the presence of water vapor in a stream of air. The sensors include those which detect relative humidity, dew point or the like. Likewise, as used in the claims, the term "humidity" refers generally to any quantity relating to the amount of water vapor held in a volume of air such as relative humidity or dew point.

In the illustrated example of the invention, air entering through the inlet 216 may have a temperature in the range of −20° to 100° F. and may have a relative humidity within the range of from 0 to 100%. In the illustrated embodiments, the air leaving the outlet 120 may have a temperature in the range of from 55° to 90° F. and may have a relative humidity in the range of from 50 to 90%.

What is claimed as new and desired to be protected by Letters Patent of the United States is:

1. An air humidifier for controlling the humidity of a stream of air, the air humidifier comprising:

a housing having an upstream inlet for receiving a stream of ambient air to be humidified and a downstream outlet for expelling the stream of air after it has been humidified;

a heater in the housing for adding heat to the stream of air;

a spray apparatus in the housing for spraying a mist of finely divided water droplets into the stream of heated air;

a mist eliminator in the housing to intercept the mist of water droplets and comprised of elongated monofilaments interlaced and sufficiently spaced from each other so that the air stream moves freely therethrough but sufficiently close to each other so that the mist of droplets is captured in a liquid phase by the mist eliminator and is substantially completely converted by flow along said monofilaments into a vapor phase in the form of increased humidity in the air stream;

a controller modulating the quantity of water sprayed from the spray apparatus;

a first humidity sensor located downstream of the mist eliminator to sense the humidity of the stream of air, the humidity sensor being in communication with the controller;

wherein the controller variably modulates the quantity of water sprayed from the spray apparatus in response to the humidity sensed by the first humidity sensor to maintain a predetermined relative humidity in the stream of air expelled from the downstream outlet, and wherein the spray apparatus has a plurality of spaced apart nozzles and plurality actuators in fluid communication with the nozzles, the nozzles spraying finely divided droplets of water, the actuators being selectively governed by the controller to regulate the quantity of water flowing to and sprayed from the nozzles and each nozzle spraying a discrete portion of the mist eliminator wherein when all nozzles are spraying water, the mist eliminator pad is essentially covered with a mist of water droplets.

2. The air humidifier of claim 1 wherein:

the monofilaments are made of a non-absorbent material.

3. The air humidifier of claim 1 wherein:

the mist eliminator includes a plurality of layers of mesh pads including an upstream mesh pad and a downstream mesh pad, each layer being oriented generally perpendicular to the flow of the stream of air, the upstream layer being made of a coarser mesh of monofilaments than the downstream layer, wherein the upstream layer intercepts larger droplets and the downstream layer intercepts smaller droplets passing through the upstream layer.

4. The air humidifier of claim 1 wherein:

the mist eliminator is a porous contacting medium characterized by:
   a. a first set of strands of material;
   b. each strand of said first set being substantially straight and parallel to every other strand in the set;
   c. each strand of said first set being spaced from every other strand in the set both vertically and horizontally;
   d. a second set of strands of material interleaved with said first set;
   e. each of the strands of said second set being substantially parallel to every other strand in the set;
   f. said strands of said first set being perpendicular to the strands of said second set;
   g. the lengths of each strand of said second set extending in interleaved fashion through the strands of said first set in a geometric orientation to fit the vertical and horizontal offset spacing of each strand in said first set;
   h. each of said strands of said second set including a plurality of substantially straight line portions with said portions connected at angles to provide said geometric orientation; and
   i. said angled geometric orientation of said second set and said offset spacing of said first set giving said medium a thickness in cross section greater than the thickness thereof prior to said geometric orientation.

5. The air humidifier of claim 1 further comprising:

a second humidity sensor located upstream of the mist eliminator to sense the humidity of the stream of air prior to its humidification.

6. The humidifier of claim 1 further comprising:

rinsing means for washing scale off of the mist eliminator.

7. The humidifier of claim 1 wherein:

the humidity sensor senses relative humidity.

8. A method for humidifying a stream of air, the method comprising:

mounting a mist eliminator of elongated interlaced monofilaments in a housing; passing a stream of air downstream through the housing;

spraying finely divided droplets of water into the stream of air with a spray apparatus;

intercepting and coalescing the droplets of water on the mist eliminator sufficiently to eliminate the droplets of water from the stream of air by passing the droplets along the filaments so that the droplets evaporate into the stream of air;

sensing the humidity of the stream of air downstream of the mist eliminator; and variably modulating the quantity of water sprayed onto the mist eliminator to maintain a predetermined level of humidity downstream from the mist eliminator;

wherein the spray apparatus has a plurality of spaced apart nozzles and a plurality of actuators in fluid communication with the nozzles, the nozzles spraying finely divided droplets of water, the actuators being selectively governed by a controller to regulate the quantity of water flowing to and sprayed from the nozzles and each nozzle spraying a discrete portion of the mist eliminator wherein when all nozzles are spraying water, the mist eliminator pad is essentially covered with a mist of water droplets.

9. The method of claim 8 wherein:

the mounting of the mist eliminator includes mounting layers of upstream and downstream mesh pads of elongated interlaced monofilaments, each layer being oriented generally perpendicular to the flow of the stream of air, the upstream layer being made of a coarser mesh of monofilaments than the downstream layer, wherein the upstream layer intercepts larger droplets and the downstream layer intercepts smaller droplets passing through the upstream layer.

10. The method of claim 8 wherein:

the spraying of droplets includes providing at least one nozzle in communication with an actuator which varies the amount of water sprayed by the nozzle.

11. The method of claim 8 further including:

sensing the humidity of the stream of air upstream from the mist eliminator.

12. The method of claim 8 further comprising:

heating the stream of air upstream from the mist eliminator to thereby control the temperature of the stream of air.

13. The method of claim 8 further comprising:

rinsing the mist eliminator with an acidic solution to remove scale from the mist eliminator.

14. An air humidifier for controlling the humidity of a stream of air, the air humidifier comprising:

a housing having an upstream inlet for receiving a stream of ambient air to be humidified and a downstream outlet for expelling the stream of air after it has been humidified;

a heater in the housing having a source of heat providing a region of intense heat for heating the stream of air;

a water supply for directing water into the region of intense heat so that the water is substantially instantaneously evaporated into the stream of air;

a controller automatically modulating the quantity of water supplied by the water supply to the region of intense heat;

a first humidity sensor located downstream of the heater for sensing the humidity of the stream of air containing the evaporated water;

a first temperature sensor located downstream of the heater for sensing the temperature of the stream of air downstream from the heater; and wherein the controller variably modulates the quantity of water sprayed and the amount of heat expelled from the heater to maintain predetermined levels of humidity and temperature in the stream of air expelled from the downstream outlet responsive to said sensors.

15. The air humidifier of claim 14 further comprising:

a fan in air flow communication with the housing which generates the stream of air passing through the housing.

16. The air humidifier of claim 14 further comprising:

a mist eliminator, located downstream of the heater, for removing droplets of water entrained in the air stream so that droplets of water are not expelled from the downstream outlet.

17. The air humidifier of claim 14 wherein:

the heater is a burner which burns a combustible gas and generates a flame providing the region of intense heat; and the water supply includes a nozzle which directs water into the flame to evaporate the water.

18. The air humidifier of claim 14 wherein:

the water supply includes a plurality of nozzles for spraying water into the flame, the controller selectively controlling the amount of water sprayed from each of the nozzles.

19. The air humidifier of claim 14 further comprising:

second humidity and temperature sensors, located upstream of the heater for sensing the humidity and temperature upstream of the heater.

20. A method for humidifying air in an air humidifier, the method comprising:

providing a region of intense heat for heating a stream of ambient air passing thereby;

supplying a quantity of water to the region of intense heat with the water being substantially instantaneously evaporated into the stream of air thereby increasing the amount of water vapor in the stream of air; and automatically variably modulating the quantity of water provided to the region of intense heat and the amount of heat transferred by the region of intense heat to the stream of air to attain a predetermined level of humidity and temperature in the stream of air downstream of the region of intense heat.

21. The method of claim 20 wherein:

the providing the region of intense heat is provided by using a burner burning a combustible gas to produce a flame which serves as the region of intense heat.

22. The method of claim 21 wherein:

providing a quantity of water includes spraying water into the flame to generally instantaneously evaporate the water into the stream of air.

23. The method of claim 20 further comprising:

providing a mist eliminator downstream of the region of intense heat for substantially removing all of the droplets of water entrained in the stream of air so that the stream of humidified air is generally free of droplets of water.

24. A system for humidifying a stream of ambient air, said system comprising:

a housing having an inlet for receiving the stream of ambient air;

a heater for providing a region of intense heat;

means for spraying water into the region of intense heat; and means for adding energy to the water within the region of intense heat such that the water is substantially instantaneously evaporated into the stream of air.

25. The system of claim 24, wherein said means for adding energy includes spraying means for simultaneously spraying pressurized air along with the water into the region of intense heat.

26. The system of claim 25, wherein said spraying means includes a plurality of nozzles, said nozzles being aligned on opposite sides of the region of intense heat.

27. The system of claim 26, wherein said heater is a burner, and wherein the region of intense heat is a flame, and wherein said nozzles are connected to said burner by brackets located on opposite sides of the flame.

28. The system of claim 26, wherein said heater is a burner, and wherein the region of intense heat is a flame, said burner being arranged such that the flame is directed downward.

29. The system of claim 28, wherein said housing has a vertical inlet portion and a horizontal portion, said burner being located in said inlet portion, said housing being arranged such that the stream of air flows through said inlet portion and then through said horizontal portion.

30. The system of claim 29, further comprising sensing means located downstream of the horizontal portion for sensing the humidity and temperature of the stream of air, and a controller for controlling the quantity of water supplied to the region of intense heat and for controlling said heater responsive to said sensing means.

31. A system for controlling the humidity of a stream of ambient air, said system comprising:

a housing having an inlet for receiving the stream of ambient air;

a heater for providing a region of intense heat, said heater being located in said housing;

nozzles for spraying water and pressurized air into the region of intense heat such that the water is substantially instantaneously evaporated into the stream of air;

sensing means located downstream of the heater for sensing the humidity and temperature of the stream of air; and a controller for automatically variably modulating the quantity of water supplied through the nozzles to the region of intense heat and for controlling said heater responsive to said sensing means.

32. The system of claim 31, further comprising a mist eliminator for removing droplets of water from the air stream, said mist eliminator being located between said heater and said sensing means.

33. The system of claim 32, wherein said heater is a burner, and wherein the region of intense heat is a flame.

34. An air humidifier for controlling the humidity of a stream of air, the air humidifier comprising:

a housing having an upstream inlet for receiving a stream of ambient air to be humidified and a downstream outlet for expelling the stream of air after it has been humidified;

a damper for regulating the flow of air;

a blower for drawing air into the humidifier;

a heater in the housing having a source of heat providing a region of intense heat for heating the stream of air;

a water supply for directing a mist of water droplets into the region of intense heat so that the water is substantially instantaneously evaporated into the stream of air;

a mist eliminator in the housing to intercept the mist of water droplets;

a controller modulating the quantity of water supplied by the water supply to the region of intense heat;

a first humidity sensor located downstream of the heater for sensing the humidity of the stream of air containing the evaporated water;

a first temperature sensor located downstream of the heater for sensing the temperature of the stream of air downstream from the heater;

wherein the controller variably modulates the quantity of water sprayed and the amount of heat expelled from the heater to maintain predetermined levels of humidity and temperature in the stream of air expelled from the downstream outlet; and wherein the speed of the air through the air humidifier is regulated by adjusting the position of the damper and variably modulating the speed of the blower.

35. The air humidifier of claim 34, wherein the speed of the air is controlled to be no more than about 500 feet per minute.

36. The air humidifier of claim 34, wherein the temperature of the stream of air expelled from the downstream outlet is less than or equal to about 90° F.

37. The air humidifier of claim 34, wherein the relative humidity in the stream of air expelled from the downstream outlet is between about 50 percent and about 90 percent.

* * * * *

UNITED STATES PATENT AND TRADEMARK OFFICE
CERTIFICATE OF CORRECTION

PATENT NO. : 5,620,503
DATED : April 15, 1997
INVENTOR(S) : Thomas L. Miller, et. al.

It is certified that error appears in the above-identified patent and that said Letters Patent is hereby corrected as shown below:

Col. 1, line 28, delete "no" and insert -- to --
Col. 4, line 10, delete "o" and insert -- of --
Col. 4, line 44, delete "air stream" and isnert -- airstream --
Col. 4, line 46, delete "air stream" and insert -- airstream --
Col. 4, line 60, delete "art" and insert -- air --
Col. 5, line 21, after "line", delete "to"
Col. 6, line 52, delete "o" and insert -- of --
Col. 7, line 5, delete "1." and insert -- 71. --
Col. 7, line 43, delete "air stream" and insert -- airstream --
Col. 8, line 20, delete "air stream" and insert -- airstream --
Col. 8, line 63, delete "air stream" and insert -- airstream --
Col. 10, line 54, delete "110" and insert -- 100 --
Col. 11, line 7, delete "air stream" and insert -- air stream --
Col. 13, line 34, "50" should be in regular font, not bold font
Col. 13, line 50, delete "air stream and insert -- airstream --
Col. 13, line 55, delete "air stream" and insert -- airstream --
Col. 14, line 2, delete "and plurality actuators" and insert -- and a plurality of actuators --
Col. 14, line 62, after "housing;" bring rest of line down to next line and indent accordingly
Col. 18, line 33, after "and", bring rest of type down to next line and start new paragraph: "Wherein the ..."

Signed and Sealed this

Ninth Day of March, 1999

Attest:

Q. TODD DICKINSON

*Attesting Officer*   *Acting Commissioner of Patents and Trademarks*